United States Patent [19]
Lee et al.

[11] Patent Number: 5,999,627
[45] Date of Patent: Dec. 7, 1999

[54] METHOD FOR EXPONENTIATION IN A PUBLIC-KEY CRYPTOSYSTEM

[75] Inventors: Pil-joong Lee, Pohang; Chae-hoon Lim, Kyungsangnam-do, both of Rep. of Korea

[73] Assignee: Samsung Electronics Co., Ltd., Kyungki-do, Rep. of Korea

[21] Appl. No.: 09/003,875

[22] Filed: Jan. 7, 1998

Related U.S. Application Data

[63] Continuation-in-part of application No. 08/467,310, Jun. 6, 1995, abandoned.

[30] Foreign Application Priority Data

Jan. 7, 1995 [KR] Rep. of Korea ............................ 95-224

[51] Int. Cl.$^6$ ................................. H04K 1/00; G06E 1/04
[52] U.S. Cl. ................................. 380/30; 380/28; 708/606
[58] Field of Search ............... 380/28, 30; 708/620–632, 708/606, 491

[56] References Cited

U.S. PATENT DOCUMENTS

| | | | |
|---|---|---|---|
| 5,299,262 | 3/1994 | Brickell et al. | 380/28 |
| 5,870,478 | 2/1999 | Kawamura | 380/30 |

OTHER PUBLICATIONS

Advances in Cryptology–Eurocrypt '92, "Fast Exponentiation with Precomputation," by Brickell et al., pp. 200–207, May 1992.

Advances in Cryptology–Crypto '94, "More Flexible Exponentiation with Precomputatiuon," by Lim et al, Aug. 1994.

*Primary Examiner*—Gail O. Hayes
*Assistant Examiner*—Hrayr A. Sayadian
*Attorney, Agent, or Firm*—Sughrue, Mion, Zinn, Macpeak & Seas, PLLC

[57] ABSTRACT

The present invention relates to an improved method for performing modular exponentiation to a fixed base element. The method includes exponentiating a first digital input signal g by a second digital input signal R, where g is a fixed signal unique to a cryptographic system and R is a randomly generated digital signal, to compute a third digital signal $g^R$. The exponentiating includes pre-computing and storing a plurality of values depending only upon the fixed signal g in a plurality of memory locations within a computing device and then speeding up the computation of $g^R$ using the stored values. The invented exponentiation method can substantially reduce the amount of computation required to compute the value for $g^R$. Exponentiation methods according to embodiments of the present invention may be used in a variety of cryptographic systems, e.g., Schnorr identification scheme, Digital Signature Standard (DSS), and Diffie-Hellman key agreement scheme, etc.

8 Claims, 8 Drawing Sheets

| (j=)2 | 1 | 0 | | |
|---|---|---|---|---|
| 0 1 | 0 1 1 | 0 1 1 | 0 | $R_0$ |
| 1 0 | 0 1 0 | 0 0 1 | 1 | $R_1$ |
| 1 0 | 1 0 0 | 1 1 1 | 2 | $R_2$ |
| 0 1 | 1 0 0 | 0 1 0 | 3 | $R_3$ |

| (j=) | 2<br>G[2] | 1<br>G[1] | 0<br>G[0] |
|---|---|---|---|
| 1 | G[2][1] | G[1][1] | G[0][1] |
| 2 | G[2][2] | G[1][2] | G[0][2] |
| 3 | G[2][3] | G[1][3] | G[0][3] |
| 4 | G[2][4] | G[1][4] | G[0][4] |
| 5 | G[2][5] | G[1][5] | G[0][5] |
| 6 | G[2][6] | G[1][6] | G[0][6] |
| 7 | G[2][7] | G[1][7] | G[0][7] |
| 8 | G[2][8] | G[1][8] | G[0][8] |
| 9 | G[2][9] | G[1][9] | G[0][9] |
| 10 | G[2][10] | G[1][10] | G[0][10] |
| 11 | G[2][11] | G[1][11] | G[0][11] |
| 12 | G[2][12] | G[1][12] | G[0][12] |
| 13 | G[2][13] | G[1][13] | G[0][13] |
| 14 | G[2][14] | G[1][14] | G[0][14] |
| 15 | G[2][15] | G[1][15] | G[0][15] |

5x5 CONFIGURATION

| 19 | 21 | 21 | 21 | 21 |
|----|----|----|----|----|
| 19 | 21 | 21 | 21 | 21 |
| 18 | 21 | 21 | 21 | 21 |
| 18 | 21 | 21 | 21 | 21 |
| 18 | 21 | 21 | 21 | 21 |

5x1 | 6x2 CONFIGURATION

| 28 | 31 | 31 |
|----|----|----|
| 28 | 31 | 31 |
| 28 | 31 | 31 |
| 28 | 31 | 31 |
| 28 | 31 | 31 |
|    | 31 | 31 |

FIG. 6A

| b | M | h | STORAGE | WORST/AVERAGE |
|---|---|---|---|---|
| 13 | {1} | 12 | 45 | 54/50.25 |
| 19 | {±1} | 9 | 76 | 45/43.00 |
| 29 | {±1, ±2} | 9 | 134 | 41/39.83 |
| 36 | {±1, 9, ±14, ±17} | 7 | 219 | 37/36.11 |
| 36 | $M_3$ | 3 | 620 | 32/31.14 |
| 64 | $M_2$ | 2 | 1134 | 27/26.58 |
| 128 | $M_3$ | 3 | 1748 | 24/23.82 |
| 256 | $M_2$ | 2 | 2751 | 21/20.92 |

FIG. 6B

| b | M | h | STORAGE | WORST/AVERAGE |
|---|---|---|---|---|
| 26 | {1} | 25 | 100 | 132/127.81 |
| 45 | {±1} | 22 | 188 | 114/111.91 |
| 53 | {±1, ±2} | 17 | 362 | 106/104.28 |
| 67 | {±1, ±2, ±23} | 16 | 512 | 100/98.72 |
| 64 | $M_3$ | 3 | 3096 | 87/85.66 |
| 122 | $M_3$ | 3 | 5402 | 75/74.39 |
| 256 | $M_2$ | 2 | 10880 | 64/63.75 |

FIG. 7A

| CONFIGURATION | STORAGE | WORST/AVERAGE |
|---|---|---|
| 2x2 | 6 | 118/98.00 |
| 2x1:3x1 | 10 | 94/82.00 |
| 3x2 | 14 | 79/72.25 |
| 3x1:4x1 | 22 | 67/62.69 |
| 4x2 | 30 | 58/55.50 |
| 4x3 | 45 | 52/49.50 |
| 5x2 | 62 | 46/45.00 |
| 4x1:5x2 | 77 | 44/42.63 |
| 5x3 | 93 | 41/40.00 |
| 5x4 | 124 | 38/37.00 |
| 5x1:6x2 | 157 | 36/35.44 |
| 6x3 | 189 | 34/33.58 |
| 6x4 | 252 | 32/31.58 |
| 6x1:7x2 | 317 | 30/29.75 |
| 7x3 | 381 | 29/28.82 |
| 7x4 | 508 | 27/26.82 |
| 7x6 | 762 | 25/24.82 |
| 8x4 | 1020 | 23/22.92 |
| 8x7 | 1785 | 21/20.92 |
| 8x1:9x4 | 2299 | 20/19.96 |

FIG. 7B

| CONFIGURATION | STORAGE | WORST/AVERAGE |
|---|---|---|
| 2x2 | 6 | 382/318.00 |
| 2x1:3x1 | 10 | 306/267.63 |
| 3x2 | 14 | 255/233.63 |
| 3x1:4x1 | 22 | 218/204.38 |
| 4x2 | 30 | 190/182.00 |
| 4x3 | 45 | 169/161.00 |
| 5x2 | 62 | 153/149.78 |
| 5x3 | 93 | 136/132.78 |
| 5x2:6x1 | 125 | 126/123.50 |
| 5x1:6x2 | 157 | 120/117.16 |
| 6x3 | 189 | 113/111.66 |
| 6x4 | 252 | 106/104.66 |
| 6x1:7x2 | 317 | 101/100.20 |
| 7x3 | 381 | 97/ 96.42 |
| 7x4 | 508 | 91/ 90.42 |
| 7x5 | 635 | 87/ 86.42 |
| 7x1:8x3 | 892 | 81/ 80.68 |
| 8x4 | 1020 | 78/ 77.75 |
| 8x5 | 1275 | 75/ 74.75 |
| 8x6 | 1530 | 73/ 72.75 |
| 8x8 | 2040 | 70/ 69.75 |
| 9x5 | 2555 | 67/ 66.89 |
| 9x6 | 3066 | 65/ 64.89 |
| 9x6:10x1 | 4089 | 62/ 61.90 |
| 9x1:10x1 | 5626 | 59/ 58.94 |
| 9x1:10x7 | 7672 | 57/ 56.95 |
| 10x2:11x4 | 10234 | 54/ 53.97 |
| 10x2:11x6 | 13305 | 52/ 51.98 |

FIG. 8

| SIGNATURE GENERATION | | | | |
|---|---|---|---|---|
| SCHEMES | n/t | BINARY | 4x2 | 8x2 |
| SCHNORR | 160/ 80 | 318/238 | 58/ 55.5 | 28/ 27.9 |
| DSS | 160/160 | 318/238 | 58/ 55.5 | 28/ 27.9 |
| BM | 512/ 80 | 1022/766 | 190/182.0 | 94/ 93.8 |

| SIGNATURE VERIFICATION | | | | |
|---|---|---|---|---|
| SCHEMES | n/t | BINARY | 4x2 | 8x2 |
| SCHNORR | 160/ 80 | 319/259 | 89/ 85.3 | 69/ 67.7 |
| DSS | 160/160 | 319/279 | 129/124.0 | 109/106.4 |
| BM | 512/ 80 | 1023/787 | 221/211.8 | 125/123.5 |

FIG. 9

| np/sp | 15 | 31 | 63 | 127 | 255 | 511 | 1023 |
|---|---|---|---|---|---|---|---|
| 2 | 39/127 | 31/103 | 27/85 | 23/73 | 19/63 | 17/57 | 15/51 |
| 4 | 20/64 | 16/53 | 14/44 | 12/38 | 10/32 | — /30 | 8/26 |
| 6 | 15/45 | 13/37 | 11/31 | 9/27 | — /23 | 7/21 | — /19 |
| 8 | 11/33 | 9/27 | — /23 | 7/21 | — /17 | — / — | 5/15 |
| 16 | 8/18 | 6/16 | — /14 | — /12 | — /10 | — / — | 4/ — |
| 32 | 7/11 | 5/ — | — /9 | — / — | — /7 | — / — | — / — |

FIG. 10

METHOD FOR EXPONENTIATION IN A PUBLIC-KEY CRYPTOSYSTEM

This disclosure is a continuation-in-part of U.S. patent application Ser. No. 08/467,310, filed Jun. 6, 1995, now abandoned.

BACKGROUND OF THE INVENTION

The present invention relates to a method for speeding up modular exponentiation for a fixed base element in a public-key cryptosystem, and more particularly, to an exponentiation method using a fixed base element-dependent pre-computation table.

Since Diffie and Hellman introduced the concept of a public-key cryptosystem in 1976, many cryptographic protocols have been developed based on the public-key cryptographic method. A public-key cryptosystem utilizes the property that it is computationally infeasible to derive a matching secret key from the public key even if the public key is made public, as long as the underlying mathematical problem remains intractable.

Two typical examples of such mathematical problems are the discrete logarithm problem and the integer factorization problem. However, the cryptosystem designed based on these problems gives a relatively poor performance compared to a conventional or symmetric cryptosystem. Therefore, the development of algorithms for reducing the amount of computation has been one of the important research fields in modern cryptology.

The most frequently used operation required in a public key cryptosystem is an exponentiation in a finite group. Typical groups include a multiplicative group in an integer ring or finite field, and an additive group on points of an elliptic curve defined in a finite field. In general, exponentiation implies computing $X^R$ for two random elements X and R in a given group. However, in many cryptographic protocols it is often necessary to compute $g^R$ for a random exponent R and a fixed base element g. For example, many protocols have been developed for authentication and digital signatures based on the difficulty of solving the discrete logarithm problem.

The problem of speeding up exponentiation in a given group (usually $Z_N$, where N is a large prime number or the product of two large prime numbers) is very important for the efficient implementation of most public-key cryptosystems. Hereinafter, for the sake of convenience, it is assumed that the computation is performed over $Z_N$, and thus multiplication denotes multiplication mod N. However, the method proposed in the present invention can be adapted for any group. Throughout the following explanation, g will be used as a fixed element in $Z_N$ and R represents an n-bit random exponent over $[0, 2^n)$, $|S|$ denotes the bit-length of S for an integer S or the cardinality of S for a set S, $\lceil x \rceil$ denotes the smallest integer not less than x (e.g., $\lceil 1.29 \rceil = 2$), and $\lfloor x \rfloor$ denotes the greatest integer not greater than x (e.g., $\lfloor 1.29 \rfloor = 1$).

A typical method for exponentiation is to use the binary algorithm, also known as the square-and-multiply method. For a 512-bit modulus and exponent, this method requires 766 multiplications on average and 1022 in the worst case. The signed binary algorithm can reduce the required number of multiplications to around 682 on average and 768 in the worst case.

On the other hand, using a moderate storage capacity for intermediate values, the performance can be considerably improved. For example, Knuth's five-window algorithm (see "The Art of Computer Programming," Vol. 2, *Seminumerical Algorithm,* by D. E. Knuth, 1981) performs exponentiation in about 609 multiplications on average, including the on-line pre-computation operation of sixteen multiplications.

The fastest algorithm known for exponentiation is the windowing method based on addition chains, where bigger windows, for example, ten in size, are used and more storage capacity for intermediate values are needed. Though finding the shortest addition chain is an NP-complete problem, it is reported that, by applying heuristics, an addition chain having a length of around 605 can be computed.

These general methods can be used for any cryptosystem requiring exponentiation such as the RSA (see "A Method for Obtaining Digital Signatures and Public-key Cryptosystems," in *Communications ACM,* by R. L. Rivest, A. Shamir and L. Adleman, 21(2), pp 126, 1978) and El Gamal (see "A Public Key Cryptosystem and a Signature Scheme Based on the Discrete Logarithm," in *IEEE Transactions on Information Theory,* by T. El Gamal, 31(4), pp 472, 1985) systems. However, in many cryptographic protocols based on the discrete logarithm problem, it is necessary to compute $g^R$ for a fixed base g but for a randomly chosen exponent R. Therefore, one can construct a pre-computation table depending only on the fixed base g, which can then be used to speed up the evaluation of $g^R$ for any random exponent R. As will be seen later, such pre-computation technique will substantially reduce the number of multiplications required for exponentiation.

SUMMARY OF THE INVENTION

It is an object of the present invention to provide a method for exponentiation in a public-key cryptosystem wherein exponentiation can be performed at high speed using a fixed base element-dependent pre-computation table.

To accomplish the above object, the method for transforming a first signal into a second signal in a manner infeasible to invert, comprises:

exponentiating a first digital input signal g by a second digital input signal R, wherein g is a fixed signal unique to a cryptographic system and R is a randomly generated digital signal of n bits, n being an integer specified by said cryptographic system, to obtain a third digital signal $g^R$, wherein the exponentiating comprises:

(a) determining integers h and v, and calculating a and b such that a is the least integer not less than the fractional number n/h and b is the least integer not less than the fractional number a/v, whereby an arbitrary n bit number can be divided into h blocks of size a and each divided block can be further subdivided into v smaller blocks of size b;

(b) precomputing and storing, in a plurality of memory locations $G[j][f]$ indexed by j and f, $0 \leq j \leq v-1$ and $0 \leq f \leq 2^h-1$, within a computing device, a plurality of values $$(g_{h-1}^{e_{h-1}} g_{h-2}^{e_{h-2}} \ldots g_1^{e_1} g_0^{e_0})^{2^{jb}}$$

where $g_i = g^{2^{ia}}$ for $0 \leq i \leq h-1$, and $f = e_{h-1} e_{h-2} \ldots e_1 e_0$ with $e_i = 0$ or 1, that is the index f corresponds to the decimal value of the binary representation $e_{h-1} e_{h-2} \ldots e_1 e_0$ and thus can take values from 0 to $2^h - 1$;

(c) dividing the exponent R into predetermined h blocks $R_i$ of size a for $i = 0, 1, \ldots, h-1$ and subdividing each of the blocks $R_i$ into predetermined v sub-blocks $R_{i,j}$ of size b for $j = 0, 1, \ldots, v-1$; and (d) computing the second signal $x=g^R$, using the stored values from the memory locations $G[j][I_{j,k}]$, as $$\prod_{k=0}^{b-1}\left(\prod_{j=0}^{v-1}G[j][I_{j,k}]\right)^{2^k}$$

where $I_{j,k}$ denotes an h-bit number formed by taking the k-th bits from the sub-blocks indexed by j in the second subscript, i.e., $R_{h-1,j}, \ldots, R_{1,j}, R_{0,j}$.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

First, the Brickell, Gordon, McCurley and Wilson method (hereinafter, the BGMW method), a pre-computation method for speeding up the computation of $g^R$ proposed by Brickell, Gordon, McCurley and Wilson at Eurocrypt '92, will be briefly described, and then embodiments of the present invention will be described in detail. The performance of each method will be compared via the accompanying drawings.

In the BGMW method, the basic strategy is to represent an exponent R in base b as $R=d_{t-1}b^{t-1}+\ldots+d_1+d_0$ and pre-compute all powers $g_i=g^{b^i}$ where $0 \leq d_i \leq b$ and $0 \leq i < t$. Then, $g^R$ can be computed by the following equation.

$$\prod_{i=0}^{t-1}g_i^{d_i}=\prod_{d=1}^{b-1}\left(\prod_{d_i=d}g_i\right)^d$$

Using a basic digit set for base b, the basic scheme can be extended so that the computation time can be further decreased while the storage capacity required is increased accordingly.

The BGMW method will now be described in more detail.

A set of integers D is called a basic digit set for base b if any integer can be represented in base b using digits from the set D. Then, a set M of multipliers and a parameter h can be chosen so that the following equation (1) becomes a basic digit set for base b.

$$D(M,h)=\{mk|m\in M,\ 0\leq k\leq h\} \quad (1)$$

Then, an n-bit exponent R can be represented as $$R = \sum_{i=0}^{t-1}d_ib^i \quad (2)$$

where $d_i=m_ik_i \in D(M,h)$. With this representation of R, $g^R$ can be computed by the following equation (3).

$$g^R = \prod_{i=0}^{t-1}g^{m_ik_ib^i} \quad (3)$$

$$= \prod_{k=1}^{h}\left(\prod_{k_i=k}g^{m_ib^i}\right)^k$$

$$= \prod_{k=1}^{h}c_k^k$$

where $$C_k = \prod_{k_i=k}g^{m_ib^i}.$$

Therefore, the powers $g^{m_ib^i}$ for all i<t and m∈M need to be pre-computed and stored. Then, $g^R$ can be computed in, at most, t+(h−2) multiplications using about t|M| pre-computed values, by the following algorithm.

$$u := \prod_{k_i=h}g^{m_ib_i};$$

$$v := u;$$

for $w := h-1$ to 1 step $-1$ $$u := u * \prod_{k_i=w}g^{m_ib^i};$$

$$v := v * u;$$

return (v);

It is easily seen that the number of multiplications performed by the above algorithm is t+(h−2) in the worst case (t-h multiplications for computing products of the form $$\prod_{k_i=w}g^{m_ib^i}$$

for w=1, ..., h and 2h−2 multiplications for completing the for-loop) and t(b−1)/b+(h−2) on average since for a randomly chosen exponent, t/b digits are expected to be zero.

The most obvious example for D is the base b number system (M={1}, h=b−1, t=⌈$\log_b(2^n-1)$⌉). For a 512-bit exponent, the choice of b=26 minimizes the expected number of multiplications. This basic scheme requires 127.8 multiplications on average, 132 in the worst case, and storage for 109 pre-computed values. A more convenient choice of base would be b=32, since the digits for the exponent R can then be computed without radix conversion by extracting five bits at a time. With this base, the required number of multiplications is increased only by one for the average case and remains unchanged for the worst case.

Figure 6A:
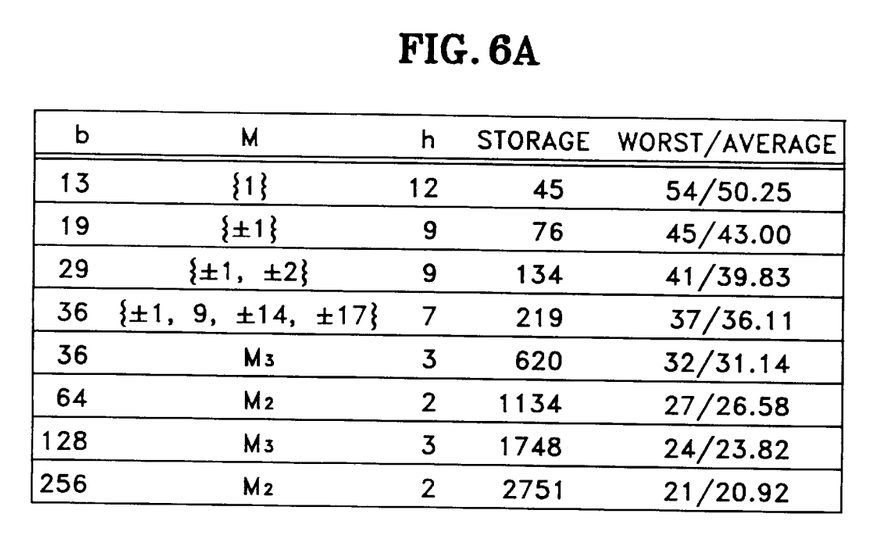
FIGS. 6A and 6B are tables for explaining the performance of the Brickell, Gordon, McCurley and Wilson method.
Figure 6B:
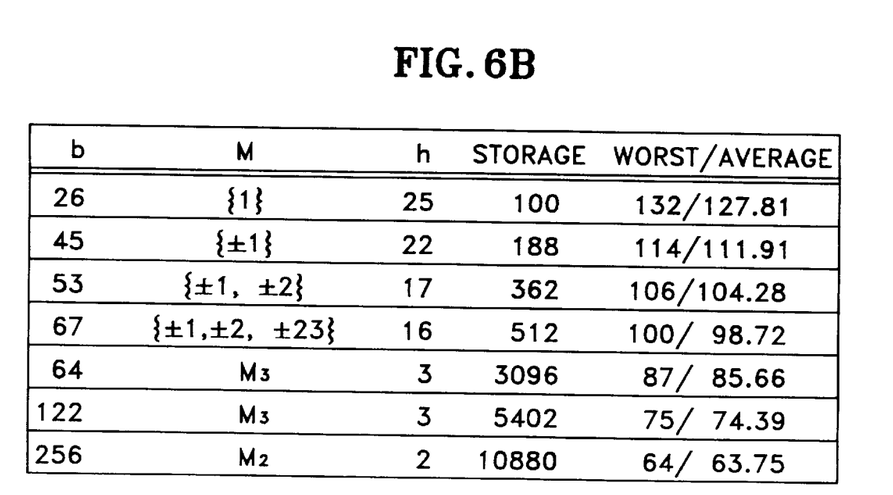

Brickell et al. also presented several schemes using other number systems to decrease the number of multiplications required—of course using more storage for pre-computed values. An extreme example is to choose the set M as follows:

$$M_2 = m | 1 \leq m < b, w_2(m) = 0 \bmod 2\}$$

where $w_p(m)$ is the highest power of p dividing m (e.g., $w_2(40)=3$). Then, for $1 \leq d_i < b$, it can be seen that $d_i = m$ or $d_i = 2m$ for some $m \in M_2$ (i.e., h=2). In this manner, with the storage for $|M_2|\lceil \log_b(2^n-1) \rceil$ values, $g^R$ can be computed in t multiplications on average and t(b−1)/b multiplications in the worst case. For example, for b=256 (t=64 and $|M_2|=170$), an average of 63.75 multiplications with 10,880 pre-computed values can be achieved. Two tables presented by Brickell et al. are shown in FIGS. 6A and 6B.

Subsequently, the exponentiation method for computing $g^R$ according to the present invention will be described.

The method according to the present invention is a generalization of the simple observation that if an n-bit exponent R is divided into two equal blocks (i.e., $R=2^k R_1 + R_0$, $|R_1|=|R_0|=k=n/2$, assuming n is even for simplicity) and $g_1 = g^{2^k}$ is pre-computed and stored, then the number of multiplications required to compute $g^R$ can be reduced by almost one half by computing $g^R$ as $g^R = g_1^{R_1} g^{R_0}$. This computation can be done by applying the binary exponentiation method in 2(k−1) multiplications in the worst case and in 7/4(k−1) multiplications on average. Notice that the number of multiplications required to compute $g^R$ is 2(n−1) in the worst case and 3/2(n−1) on average when it is simply computed without precomputation of $g_1 = g^{2^k}$.

The method according to the present invention is now described in more detail.

First, let R be an arbitrary n-bit exponent for which $g^R$ is to be computed. The objective of the invention is to reduce the on-line computational load to compute $g^R$ by utilizing a plurality of values precomputed from the fixed base g and stored in a plurality of memory locations in a computing device. Thus the method for computing $g^R$ according to the present invention mainly comprise two steps. In the first step a plurality of values only depending upon the fixed base g is precomputed and stored in a memory device. This step is done only once for a given base g and the bit-length n of an exponent, which are unique to a specific cryptographic system. In the second step, for a given n-bit exponent R in the cryptographic system, the value for $g^R$ is on-line computed using the plurality of values prestored in the first step.

Figure 1:
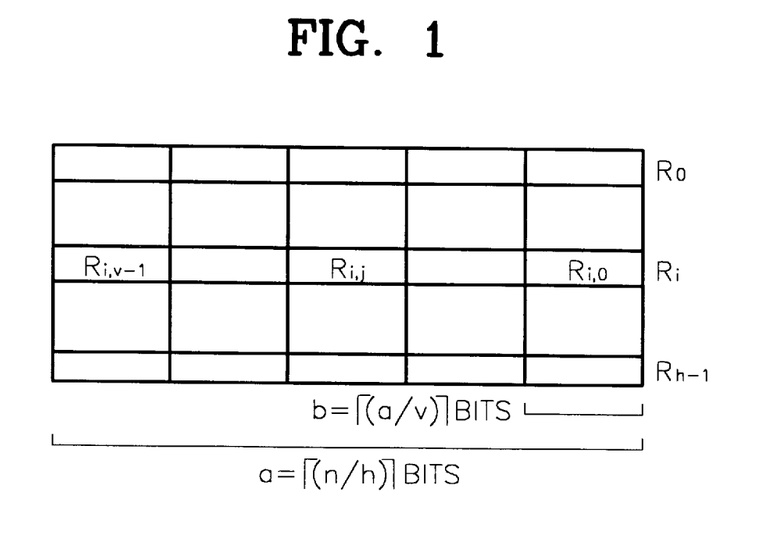
FIG. 1 shows a method of dividing and arranging an arbitrary n-bit exponent.

The mathematical background of the present invention is first explained to show how to obtain a plurality of prestored values to speed up the evaluation of $g^R$. First, suppose that the exponent R is divided into hv blocks of fixed size and then arranged into an h×v two-dimensional array as shown in FIG. 1, where the integer variables h and v determines the storage requirement and performace of the present invention. That is, R is divided into h blocks $R_i$ ($0 \leq i \leq h-1$) of size $a = \lceil n/h \rceil$ bits, and then each $R_i$ is subdivided into v smaller blocks $R_{i,j}$ ($0 \leq j \leq v-1$) of size $b = \lceil a/v \rceil$ bits. Then the divisions of R into large blocks $R_i$ can be expressed by $$R = R_{h-1} \ldots R_1 R_0 \quad (4)$$

$$= \sum_{i=0}^{h-1} R_i 2^{ia}$$

and the further subdivisions of each value of $R_i$ into smaller blocks $R_{i,j}$ can be expressed by $$R_i = R_{i,v-1} \ldots R_{i,1} R_{i,0} \quad (4')$$

$$= \sum_{j=0}^{v-1} R_{i,j} 2^{jb}.$$

In the expressions (4) and (4'), the value for $R_i$ corresponds to the i-th row and the value for $R_{i,j}$ corresponds to the (i,j)-th element of the h×v matrix in FIG. 1.

Let $g_0 = g$ and define $g_i$ as $g_i = g_{i-1}^{2^a} = g^{2^{ia}}$ for $0 < i < h$. Then, using equations (4) and (4'), $g^R$ can be expressed by $$g^R = \prod_{i=0}^{h-1} g_i^{R_i} \quad (5)$$

$$= \prod_{j=0}^{v-1} \prod_{i=0}^{h-1} \left( g_i^{2^{jb}} \right)^{R_{i,j}}$$

Let $R_i = (e_{i,a-1} \ldots e_{i,1} e_{i,0})_2$ be the binary representation of $R_i$ ($0 \leq i < h$). Then $R_{i,j}$ ($0 \leq j < v$) is represented in binary form as follows.

$$R_{i,j} = e_{i,jb+b-1} \ldots e_{i,jb+k} \ldots e_{i,jb+1} e_{i,jb}$$

$$= \sum_{k=0}^{b-1} 2^k e_{i,jb+k}$$

Therefore, the expression (5) can be rewritten as follows:

$$g^R = \prod_{j=0}^{v-1} \prod_{i=0}^{h-1} \left( g_i^{2^{jb}} \right)^{\sum_{k=0}^{b-1} 2^k e_{i,jb+k}} \quad (6)$$

$$= \prod_{k=0}^{b-1} \left( \prod_{j=0}^{v-1} \left( \prod_{i=0}^{h-1} g_i^{e_{i,jb+k}} \right)^{2^{jb}} \right)^{2^k}$$

This expression (6) is the basis for the construction of a pre-computation table in the present invention.

Figure 2:
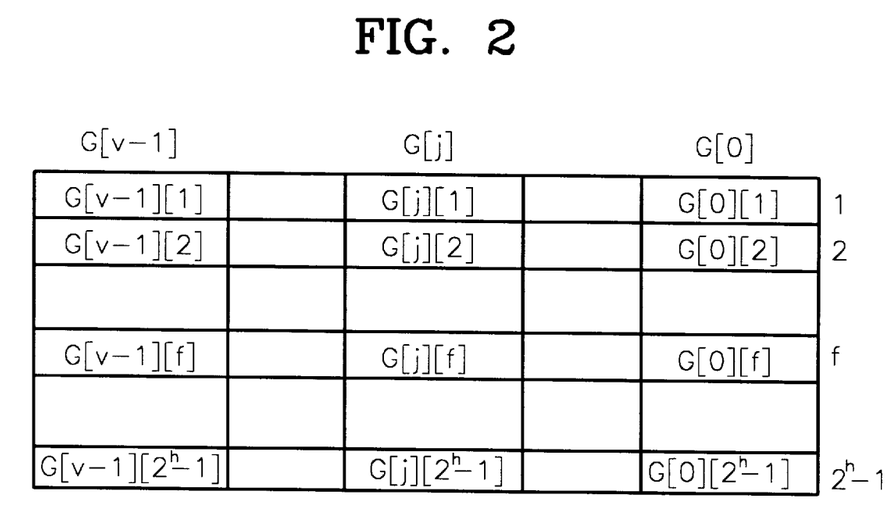
FIG. 2 is a table for the pre-computed values related to FIG. 1.

Now it is explained how to compute a plurality of values to be prestored for fast evaluation of $g^R$ using the equation (6). The idea is to pre-compute and store all possible combinations of the product of the $g_i$ for $0 \leq i < h$ and their $2^{jb}$-th powers for $0 \leq j < v$, so that the pre-computation table can be used to evaluate any value of $g^R$ for a given number R of size n. Let G[j][f] be the value stored in the (j,f)-th memory location of two dimensional array named by G in a computing device. The values for G[0][f] for $1 \leq f < 2^h$ is computed as $$G[0][f] = g_{h-1}^{e_{h-1}} g_{h-2}^{e_{h-2}} \ldots g_1^{e_1} g_0^{e_0} \quad (6.5),$$

where f represents the decimal value for the binary number $e_{h-1} \ldots e_1 e_0$ obtained by concatenating the exponent bits. The equation (6.5) illustrates an expression for all of the precomputed values stored in column 0 in memory as illustrated by the rightmost column G[0] in FIG. 2. Next, the $2^{jb}$-th powers of G[0][f] for 0<j<v, which are the values stored in column j in memory in FIG. 2, are obtained recursively from Equation 6.5 as $$G[j][f] = (G[j-1][f])^{2^b} \quad (7)$$
$$= (G[0][f])^{2^{jb}}$$

Once the values computed according to the equations (6.5) and (7) are stored in memory locations G[j][f] for $0 \leq j < v$ and $1 \leq f < 2^h$, the equation (6) can be evaluated as follows:

$$g^R = \prod_{k=0}^{b-1} \left( \prod_{j=0}^{v-1} G[j][I_{j,k}] \right)^{2^k} \quad (8)$$

Here, $I_{j,k}=(e_{h-1,bj+k} \cdots e_{1,bj+k}e_{0,bj+k})_2$, which corresponds to the value for the k-th bit column in the j-th block column in FIG. 1 and $G[j][I_{j,k}]$ represents the prestored value located at column j, row $I_{j,k}$ in FIG. 2.

Now, it is straightforward to compute $g^R$ using equation (8) by the extended square-and-multiply method as illustrated in the following algorithm executable by a computer.

$$Z := 1; \quad (9)$$
$$\text{for } k := b - 1 \text{ to } 0 \text{ step} - 1$$
$$\quad Z := Z * Z;$$
$$\quad \text{for } j := v - 1 \text{ to } 0 \text{ step} - 1$$
$$\quad\quad Z := Z * G[j][I_{j,k}];$$
$$\text{return } (Z);$$

Next, the number of multiplications required to compute $g^R$ by the algorithm (9) is counted. It should be noted that the (v−1)-th blocks in FIG. 1 may not be full of b bits. In fact, they are of (bv−a)-bit size. Thus, the number of terms to be multiplied together in the inner for-loop in the algorithm (9) is v for the first bv−a iterations and v+1 for the remaining (b−bv)+a iterations. Therefore, the total number of multiplications required is at most v(bv−a)+(v+1)×(b−bv+a)−2= a+b−2 in the worst case. Since it can be assumed that the probability of $I_{j,k}$ being zero is $1/2^k$ on average and there are a occurrences of $I_{j,k}$ in the algorithm, the expected number of multiplications is given by $a(2^h-1)/2^h+(b-2)$. Of course, this performance is achieved with storage for $v(2^h-1)$ pre-computed values.

The aforementioned exponentiation method according to the present invention will be described using an example for more detailed explanation. In this example, suppose that for a given base element g unique to a cryptographic system, it is required to evaluate $g^R$ with random 32-bit number R in the cryptographic system. Also, suppose that, as an example, a 4×3 configuration is selected for building a pre-computation table (i.e., n=32, h=4 and v=3). Then, the values for a and b are calculated by $$a = \lceil n/h \rceil = \lceil 32/4 \rceil = 8$$
$$b = \lceil a/v \rceil = \lceil 8/3 \rceil = 3$$

To build a pre-computation table, let $g_0=g$ and define $g_i$ as $g_i = g_{i-1}^{2^8} = g^{2^{8i}}$ for i=1, 2 and 3 as explained before. That is, $g_0=g$, $g_1=(g^{256})^1$, $g_2=(g^{256})^2$ and $g_3=(g^{256})^3$. At system initialization stage, once and for all, the following values are pre-computed and stored in memory locations G[j][f] within a computing device for $1 \leq f < 15$ and $0 \leq j < 3$:

$$G[0][f] = g_3^{e_3} g_2^{e_2} g_1^{e_1} g_0^{e_0}$$
$$G[j][f] = (G[j-1][f])^{2^3}$$
$$= (G[0][f])^{2^{j3}}$$

where the index f is equal to the decimal value of $(e_3e_2e_1e_0)_2$.

For example, the values for G[0][f] for $1 \leq f < 15$ are computed as follows (note that G[0][0] is always equal to 1):

TABLE 1

| j f | $e_3$ $e_2$ $e_1$ $e_0$ |
|---|---|
| G[0][1] = | $g_3^0 g_2^0 g_1^0 g_0^1 = g_0$ |
| G[0][2] = | $g_3^0 g_2^0 g_1^1 g_0^0 = g_1$ |
| G[0][3] = | $g_3^0 g_2^0 g_1^1 g_0^1 = g_1 g_0$ |
| G[0][4] = | $g_3^0 g_2^1 g_1^0 g_0^0 = g_2$ |
| ⋮ | |
| G[0][14] = | $g_3^1 g_2^1 g_1^1 g_0^0 = g_3 g_2 g_1$ |
| G[0][15] = | $g_3^1 g_2^1 g_1^1 g_0^1 = g_3 g_2 g_1 g_0$ |

Also, each value for G[j][f] for j=1, 2 is computed by raising each value for G[0][f] to the $2^{3j}$th power.

Now, suppose that the cryptographic system needs evaluate $g^R$ for a 32-bit number R given by $$R = 01100010101001111001000101011011_{(2)}.$$

Figure 3:
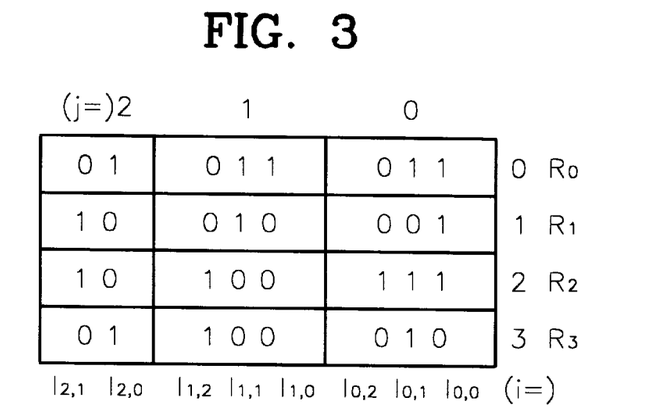
FIG. 3 is an example of the method of FIG. 1 for a 32-bit exponent.
Figure 4:
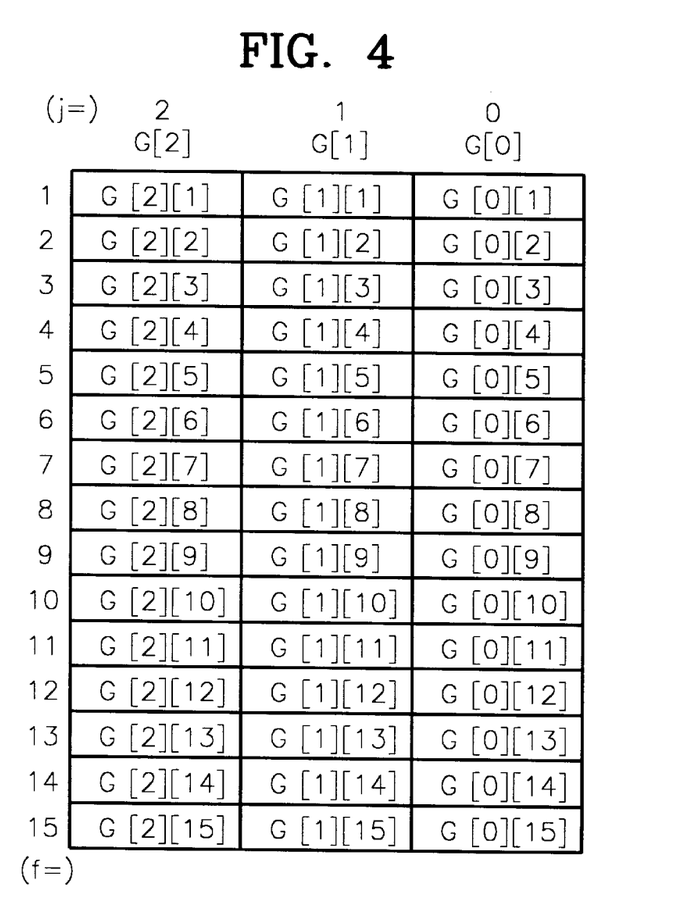
FIG. 4 is a table for the pre-computed values related to FIG. 3.

This exponent R is first partitioned into a 4×3 matrix form as shown in FIG. 3. That is, $$R_0 = 01011011_{(2)}$$
$$= 01_{(2)} \times 2^6 + 011_{(2)} \times 2^3 + 011_{(2)} \times 2^0$$

$$R_1 = 10010001_{(2)}$$
$$= 10_{(2)} \times 2^6 + 010_{(2)} \times 2^3 + 001_{(2)} \times 2^0$$

$$R_2 = 10100111_{(2)}$$
$$= 10_{(2)} \times 2^6 + 100_{(2)} \times 2^3 + 111_{(2)} \times 2^0$$

$$R_3 = 01100010_{(2)}$$
$$= 01_{(2)} \times 2^6 + 100_{(2)} \times 2^3 + 010_{(2)} \times 2^0$$

Then, using the equation (8), $g^R$ can be computed by $$g^R = \prod_{k=0}^{2} \left( \prod_{j=0}^{2} G[j][I_{j,k}] \right)^{2^k} \quad (8')$$

For each j and k, the value for $I_{j,k}$ is obtained by taking the k-th bit column in the j-th columns of sub-blocks as illustrated in FIG. 3. That is, $$I_{0,0} = e_{3,0}e_{2,0}e_{1,0}e_{0,0} = 0111_{(2)} = 7$$
$$I_{0,1} = e_{3,1}e_{2,1}e_{1,1}e_{0,1} = 1101_{(2)} = 13$$
$$I_{0,2} = e_{3,2}e_{2,2}e_{1,2}e_{0,2} = 0100_{(2)} = 4$$

$I_{1,0} = e_{3,3}e_{2,3}e_{1,3}e_{0,3} = 0001_{(2)} = 1$ $I_{1,1} = e_{3,4}e_{2,4}e_{1,4}e_{0,4} = 0011_{(2)} = 3$ $I_{1,2} = e_{3,5}e_{2,5}e_{1,5}e_{0,5} = 1100_{(2)} = 12$ $I_{2,0} = e_{3,6}e_{2,6}e_{1,6}e_{0,6} = 1001_{(2)} = 9$ $I_{2,1} = e_{3,7}e_{2,7}e_{1,7}e_{0,7} = 0110_{(2)} = 6$

For notational convenience, let $$Z_k = \prod_{j=0}^{2} G[j][I_{j,k}]$$

Here each value of $Z_k$ for k=0,1,2 is computed as follows:

$$Z_1 = \prod_{j=0}^{2} G[j][I_{j,1}]$$
$$= G[2][I_{2,1}]G[1][I_{1,1}]G[0][I_{0,1}]$$
$$= G[2][6]G[1][3]G[0][13]$$

Therefore, the value for $g^R$ can be obtained from the values $Z_0$, $Z_1$ and $Z_2$ as follows:

$$g^R = \prod_{k=0}^{2} (Z_k)^{2^k}$$
$$= Z_2^{2^2} Z_1^{2^1} Z_0^{2^0}$$

$$Z_2 = \prod_{j=0}^{2} G[j][I_{j,2}]$$
$$= G[2][I_{2,2}]G[1][I_{1,2}]G[0][I_{0,2}]$$
$$= G[2][0]G[1][12]G[0][4]$$
$$= G[1][12]G[0][4]$$

$$Z_0 = \prod_{j=0}^{2} G[j][I_{j,0}]$$
$$= G[2][I_{2,0}]G[1][I_{1,0}]G[0][I_{0,0}]$$
$$= G[2][9]G[1][1]G[0][7]$$

As described above, the exponentiation method using the pre-computed values stored in a plurality of memory locations has been explained in detail by way of a small-size example. Of course, the bit size of the exponent R may be much larger in practical applications.

It has been assumed that the exponent R is partitioned into hv blocks of almost equal size and that these hv blocks are arranged in an h×v rectangular shape. In most cases, such partitions and arrangements yield better performance than others for a given storage capacity, but sometimes this may not be the case. For example, consider two configurations shown in FIG. 5, where a 512-bit exponent is partitioned and arranged in two different ways.

Figure 5:
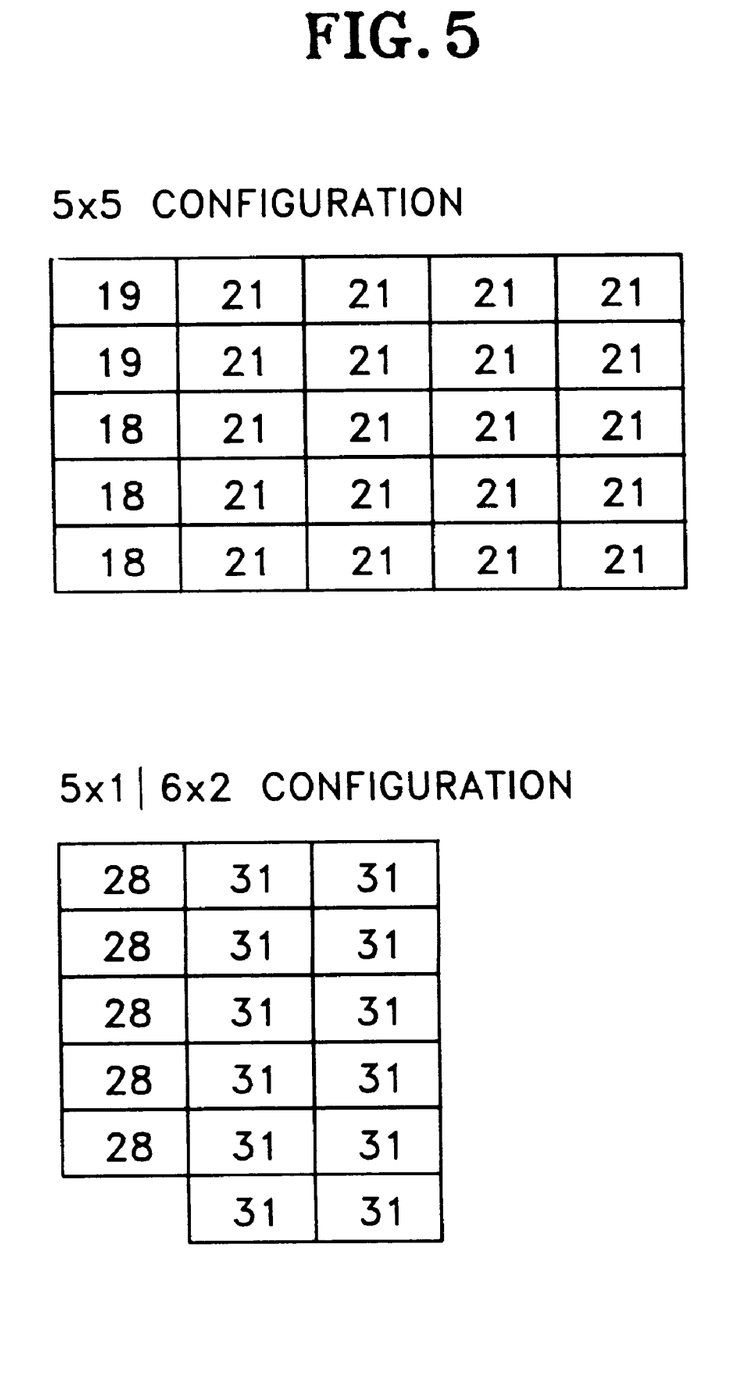
FIG. 5 shows two different configurations having about the same storage requirement in the pre-computed table.

The first 5×5 configuration corresponds to the case having been analyzed above and results in the performance of 118.78 multiplications on average (122 in the worst case) with storage for 155 values. On the other hand, with the second 5×1|6×2 configuration, the exponentiation can be done in 117.13 multiplications on average (119 in the worst case). Therefore, it can be seen that the second configuration is the better choice.

For the configuration of type $h_1 \times v_1 | h_2 \times v_2$, a general formula for the worst-case and average-case performance can be easily derived. Let $b_1$ and $b_2$ be the size of partitioned blocks in $h_1 \times v_1$ and $h_2 \times v_2$, respectively. For better performance, $b_2$ must be greater than or equal to $b_1$ and can be obtained in the same way as b in the h×v configuration. Thus, $b_1$ and $b_2$ can be obtained as follows:

$b_2 = \lceil n/(h_1 v_1 + h_2 v_2) \rceil$ $b_1 = \lceil (n - b_2 h_2 v_2)/h_1 v_1 \rceil$ Now, the worst-case number of multiplications required for this configuration can be directly obtained from the formula for the h×v configuration by replacing a with $h_1 v_1 + h_2 v_2$ and b with $b_2$, respectively. This results in $b_1 v_1 + b_2(v_2 + 1) - 2$ multiplications in the worst case. Similarly, the average number of multiplications can be obtained as follows:

$$b_1 v_1 \left(\frac{2^{h_1} - 1}{2^{h_1}}\right) + b_2 v_2 \left(\frac{2^{h_2} - 1}{2^{h_2}}\right) + (b_2 - 2)$$

This performance can be achieved with the storage for $v_1(2^{h_1}-1) + v_2(2^{h_2}-1)$ pre-computed values. It can be easily seen that no configurations other than the two types h×v and $h_1 \times v_1 | h_2 \times v_2$ (where $h_2 = h_1 + 1$) yield better performance for a given storage capacity.

Figure 7A:
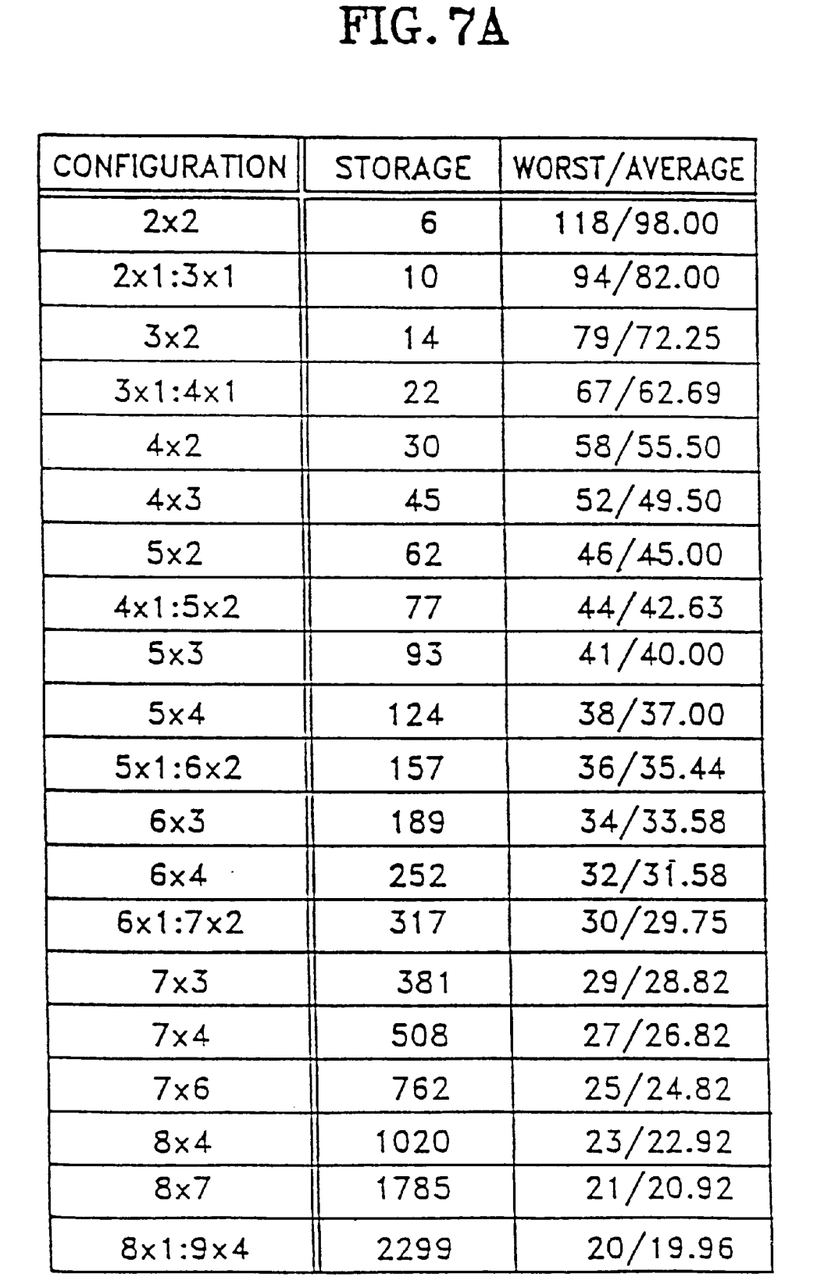
FIGS. 7A and 7B are tables for explaining the performance of the method according to the present invention.
Figure 7B:
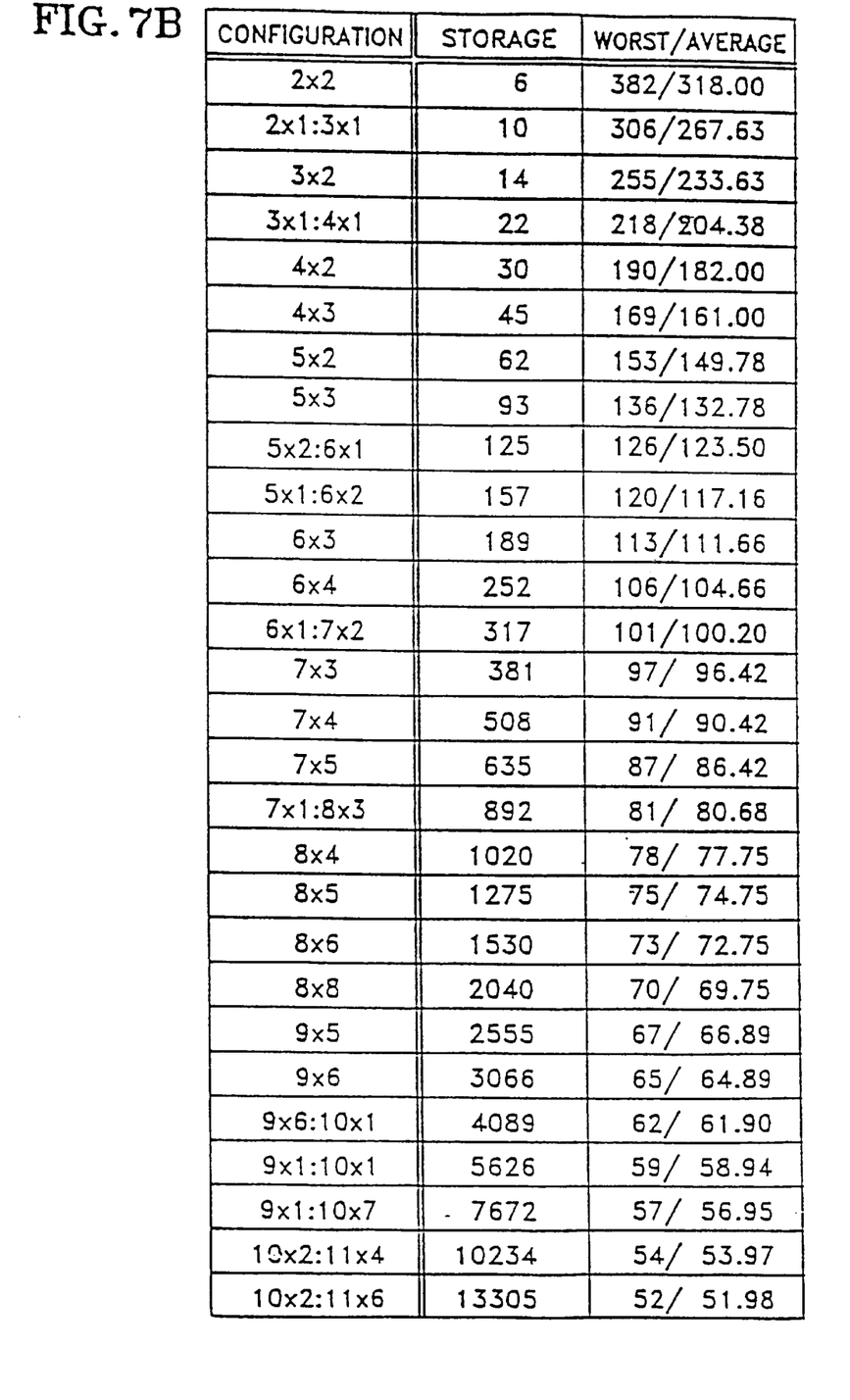

FIGS. 7A and 7B illustrate the performance of the present invention and show a configuration of an exponent R and the storage capacity for pre-computed values and the number of multiplications for the worst case and the average case. Here, FIG. 7A is a table for an 160-bit exponent, and FIG. 7B is a table for a 512-bit exponent.

In order to compare the performance of the BGMW method and the present invention, with respect to the respective 160-bit and 512-bit exponents, the number of multiplications and storage requirements by the BGMW method are also shown in FIGS. 6A and 6B. FIG. 6A is a table for a 160-bit exponent, and FIG. 6B is a table for a 512-bit exponent.

The invented method for exponentiation can also be used to evaluate multiple-term exponentiation, which is required in some cryptographic applications such as probabilistic batch verification of digital signatures (see "Can DSA be improved? Complexity trade-offs with the digital signature standard," in Advances in Cryptology-Eurocrypt'94, by D. Naccache, D. M'Raihi, S. Vaudenay and D. Raphaeli, pp.77–85). For example, suppose that it is required to compute $$z = \prod_{i=1}^{m} x_i^{K_i}$$

for given values of $x_i$ and $K_i$, where the bit-length of each $K_i$ is assumed to be t and each $x_i$ varies in each computation (i.e., not fixed, contrary to g in the previous embodiment).

If each exponential term is computed using the binary method, this computation requires 1.5 m(t-1) multiplications on average and 2 m(t-1) in the worst case. However, the computation time can be substantially reduced by applying the invented method. The process to evaluate z is the same as before, except that each of $g_i$ in the previous embodiment is replaced by each of $x_i$. Thus, in this application, it suffices to arrange the m exponentials into h×v configuration for appropriate values of h and v, on-line precompute products of all possible combinations among h values of $x_i$ in each column of h blocks and then apply the extended binary exponentiation method described before (see algorithm (9)). Then it can be easily seen that the total number of multiplications required is $(v+1)t+(2^h-h-1)v-2$ in the worst case and $vt(2^h-1)/2^h+t+(2^h-h-1)v-2$ on average. Note here that $(2^h-h-1)v$ accounts for the number of multiplications required for on-line precomputation.

For more explicit explanation, let us take an example with m=12, t=160 and 4×3 configuration. Then the above method requires 671 multiplications in the worst case and 641 on average. This can be compared to the case of evaluating each exponentiation using the binary method requiring 3816 multiplication in the worst case and 2862 on average. Thus, in this example the invented method can achieve more than a four-fold improvement over the binary method for the average case.

Another advantage of the present invention is its efficiency in computing exponentiation of the form $g^R y^E$, where y is not fixed and the size of E is assumed to be much less than the size of R, which is the case for the verification of Schnorr's identification and signature scheme(see "Efficient signature generation by smart cards," in J. Cryptology, by C. P. Schnorr, 4(3), pp 161–174, 1991) or its variants, e.g., Brickell-McCurley's scheme (see "An Interactive Identification Scheme Based On Discrete Logarithms and Factoring", by E. F. Brickell and K. S. McCurley, *J. Cryptology* 5(1), pp 29–39, 1992) and Okamoto's scheme (see "Probably Secure and Practical Identification Schemes and Corresponding Signature Schemes", by T. Okamoto, *Proc. Crypto'92*, 1992).

In all these schemes, along with a few modular multiplications, the prover (or the signer) needs to compute $g^R$ for a random R, which can be efficiently performed by the method described above. On the other hand, to validate the prover's identity or to verify the signature, the verifier needs to perform the computation of the form $g^R y^E$ where y corresponds to the public key of the prover (or the signer) and thus varies in each run of the protocol. The size of E typically lies between 20 and 40 in identification schemes. The performance of the proposed method for computing $g^R y^E$ will be investigated below.

Let t be the size of E. It is clear that if $t \leq b$, then $g^R y^E$ can be computed in $a+b+(t-2)$ multiplications in the worst case and $a(2^h-1)/2^h+b+0.5\ t-2$ on average. In case of t>b, the process can be proceeded as above or the computation can be done after partitioning E into smaller blocks. The first case yields the performance of $a+2\ t-2$ multiplications in the worst case and $a(2^h-1)/2^h+1.5\ t-2$ multiplications on average. However, if t is much larger than b, the performance can be further improved by dividing E into smaller blocks.

Thus, for more general formula, suppose that E is partitioned into u blocks of almost equal size. (It is considered that the whole configuration for computing $g^R y^E$ is $u \times 1 | h \times v$.)

Let c be the bit-length of the partitioned blocks (i.e., $c = \lceil t/u \rceil$). Then, $y^{2^{kc}}$ for k=1, 2, ..., u−1, and each product of their possible combinations has to be first computed, which all together requires $c(u-1)+2^u-u-1$ multiplications. For the range of interested t, e.g., up to t=80, u will be at most three.

Now, if $c \leq b$, then at most c additional multiplications are sufficient in the worst case and $c(2^u-1)/2^u$ are sufficient on average. Therefore, the total number of multiplications required in this case is $a+b+uc+(2^u-u-3)$ in the worst case and $a(2^h-1)/2^h+b+c(u2^u-1)/2^u+2^u-u-3$ on average.

Similarly, for the case of c>b, it can be easily shown that the number of multiplications is $a+(u+1)c+2^u-u-3$ in the worst case and $a(2^h-1)/2^h+c((u+1)2^u-1)/2^u+2^u-u-3$ on average.

With the invented exponentiation method, the Schnorr-like identification and/or signature schemes can be made more practical for smart card implementations. For example, with 160-bit exponents and t=30, the verification condition can be checked in 80.5 multiplications on average, if 1,920 bytes of storage are available (for a 4×2 configuration). Similarly, a signature with t=80 can be verified in 144.13 multiplications on average using the same storage capacity. This is a considerable improvement with only a very small storage capacity, compared with the binary method requiring 246.5 multiplications for t=30 and 259.0 multiplications for t=80 on average.

Moreover, identification or signature verifications are usually performed in much more powerful terminals capable of being equipped with a large amount of memory. In such an environment, the 8×2 configuration, for example, may be adopted. Then identity verifications can be done in 60.2 multiplications on average for t=30 and signature verifications can be done in 126.6 multiplications on average for t=80, using about 32 Kbytes of storage.

Next, it will be explained that small additional communication can considerably reduce the number of multiplications for computing $g^R y^E$ again. That is, the verifier can save the on-line computational load for preparing $y_k = y^{2^{kc}}$ for k=1, 2, ..., u−1, if they are pre-computed and stored by the signer (or the prover) and then transmitted to the verifier together with other data.

For example, for the signature scheme with t=80, if the signer sends two additional values $y_1$ and $y_2$, where $y_1 = y^{2^{27}}$ and $y_2 = y_1^{2^{27}}$, together with a signature for message, then the signature verification can be done in 90.13 multiplications on average with the 4×2 configuration. Therefore, 54 multiplications can be saved with the increase of a small increase of communication. This corresponds to about a 3-fold improvement on average over the binary method which requires 259 multiplications on average.

It can be seen that the BGMW method is less efficient for the computation of the form $g^R y^E$ in either case considered above. That is, in case of no additional communication, if the exponents are represented in non-binary power base, more computations are needed in performing the on-line precomputation required for $y^E$. When additional communication is allowed, more pre-computed values must be transmitted due to the use of a small base.

The above method of combining pre-computation and additional communication can be used to speed up the verification of the digital signature standard (DSS) as well. In DSS, the computation of the type $g^R y^E$ should be performed with $|R|=|E|=160$, and therefore, without additional communication, no advantage can be gained with pre-computation.

However, if the signer sends three additional blocks $\{y_1, y_2$ and $y_3\}$, where $y_i = y_{i-1}^{2^{40}}$ for $i = \{1, 2, 3\}$, and if the verifier adopts the 4×2 configuration, then the signature can be verified in 124 multiplications on average. This is more than a 2-fold improvement over the binary method which requires 279 multiplications on average, with only 1,920 bytes of storage and 192 bytes of additional communication (for a 512-bit modulus).

Figure 8:
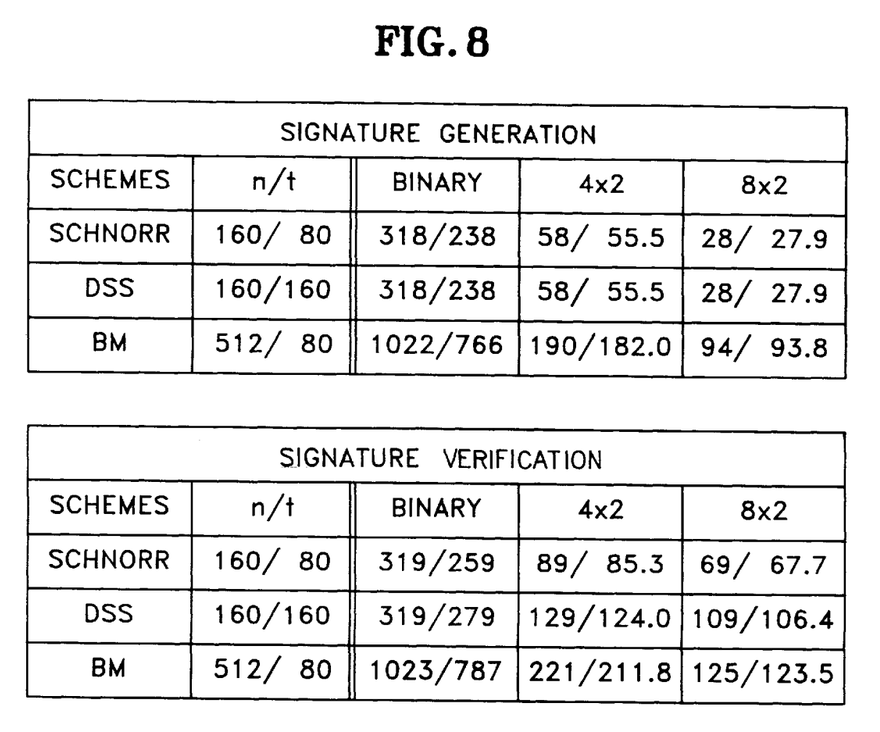
FIG. 8 is a table showing the number of multiplications required for signature generation and verification in various signature schemes.

FIG. 8 shows the number of multiplications required for signature generation and verification in three signature schemes (Schnorr, DSS and Brickell-McCurley), under the assumption that the signer sends three additional pre-computed values for the public key together with a signature, as mentioned above. Here, only the number of multiplications for exponentiation operations is taken into account, which disregards some necessary operations such as reduction mod q and multiplicative inverse mod q where g is a prime of about 160 bits.

Two configurations of 4×2 and 8×2 are taken as examples, since the former is suitable for smart card applications and the latter for more general applications with a relatively large storage capacity available. For comparison, the performance of the binary method is also presented.

Another Embodiment of the present invention is to do the exponentiation $g^R$ in parallel with multiple processors. For example, suppose that v processors are available. Then, one can assign the j-th processor to compute the j-th column of the h×v configuration (see FIG. 1). That is, the j-th processor can be assigned to compute $$\prod_{k=0}^{b-1}(G[j][I_{j,k}])^{2^k}$$

in the expression of $$g^R = \prod_{j=0}^{v-1}\prod_{k=0}^{b-1}(G[j][I_{j,k}])^{2^k}$$

where the pre-computed values are the same as before but each processor oily stores in its local memory $2^h-1$ pre-computed values needed for its computation. Then the computation of each processor can be completed in at most 2(b−1) multiplications. Thereafter, $\lceil \log_2 v \rceil$ multiplications are needed in addition to produce the final result. Therefore, the total number of multiplications required is at most $2(b-1)+\lceil \log_2 v \rceil$.

Figure 9:
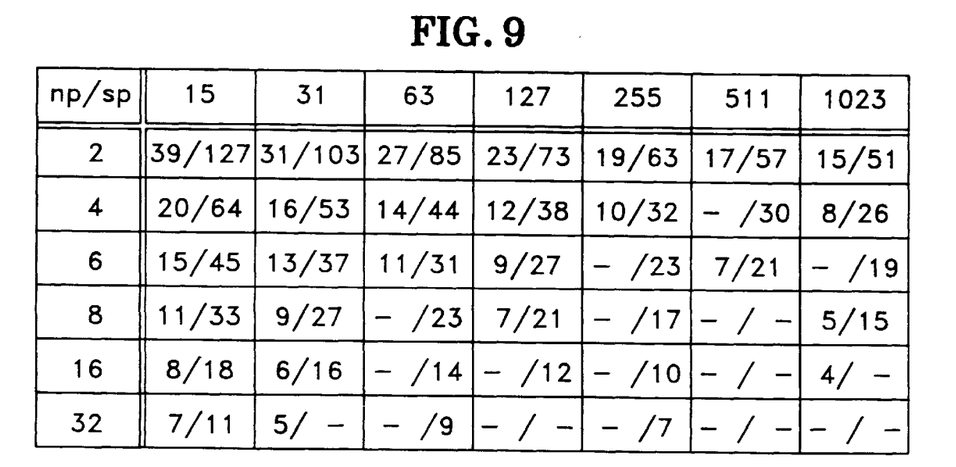
FIG. 9 is a table showing the number of multiplications required for parallel processing.

FIG. 9 shows the number of multiplications required for parallel processing in the case of 160/512 bit exponents, according to the number of processors (denoted by np) and the storage needed per processor (denoted by sp). As shown in FIG. 9, with only a small number of processors, the performance can be greatly improved. For example, for a 512-bit exponent, the computation of $g^R$ can be done in 32 multiplications with four processors if each processor stores 255 pre-computed values in its local memory (about 16 Kbytes). With more processors, say sixteen, the exponentiation can be done in ten multiplications with the same storage capacity.

Meanwhile, in the above, only the case of v processors being available for an h×v configuration was considered for the sake of convenient explanation. However, an h×v configuration can also be used with smaller processors. For example, if p processors are available for h×v configuration, each processor can be assigned to compute $w=\lceil v/p \rceil$ columns in the h×v configuration. In this case, each processor should store $w(2^h-1)$ pre-computed values in its local memory. Then, it is easy to see that the number of required multiplications is given by $(w+1)b+\lceil \log_2 p \rceil-2$. Practically, in most cases, it is more advantageous to assign many columns to each processor in a time-storage tradeoff than one column assignment considered in FIG. 9.

As described above, according to the present invention, a new method for fast exponentiation with pre-computation has been described. The invented method is very simple and easy to implement systematicaly, but achieves better performance than the BGMW method.

Also, the method according to the present invention is flexibly applicable to various computing environments due to its wide range of time-storage tradeoffs. In particular, the computation by smart cards can be substantially speeded up with only a very small storage capacity. The present invention can also speed up the computation of the form $g^R y^E$ with y variable. This can greatly improve the practicality of the Schnorr-type identification and signature scheme, since the verifier as well as the prover (signer) can gain great computational advantage with a moderate storage capacity.

Finally, the parallel processing according to the present invention may be useful in high performance servers with multiple processors.

The present invention provides a method for reducing the amount of computation to evaluate $g^R$ for a fixed g and a random R by storing a plurality of pre-computed values in memory within a computing device. The computation of $g^R$ is an essential operation in all discrete logarithm-based cryptographic systems, such as the Schnorr identification scheme, the Digital Signature Standard (DSS) and Diffie-Hellman key agreement or exchange scheme.

Figure 10:
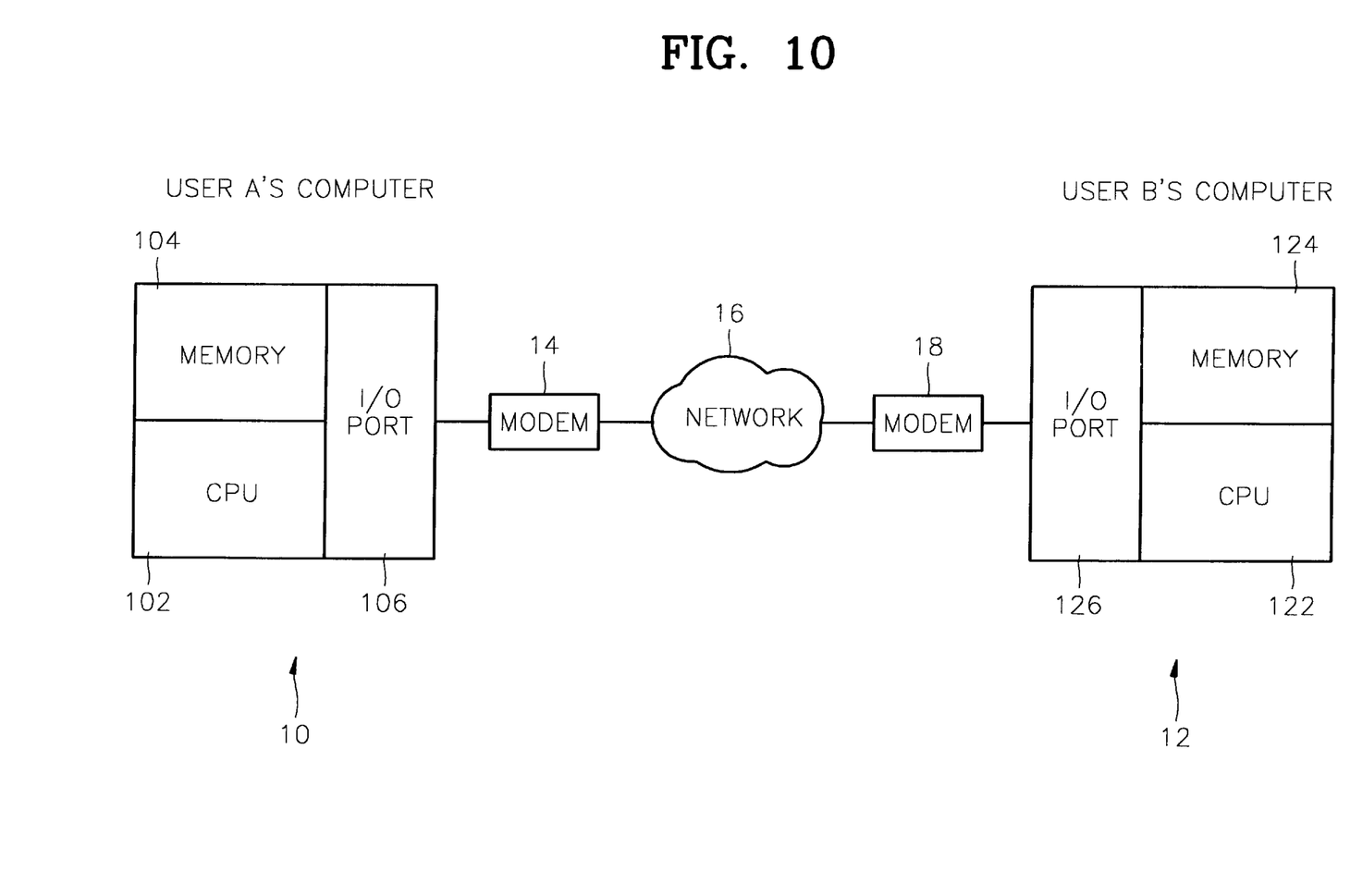
FIG. 10 is a block diagram of a cryptographic system utilizing an improved method of exponentiation in accordance with an embodiment of the present invention.

For example, FIG. 10 is a block diagram of a cryptographic system constructed in accordance with a preferred embodiment of the present invention. The cryptographic system comprises computers 10 and 12, having network interfaces or modems 14 and 18, respectively, for communicating with each other over a communications network 16. The computer 10 includes a CPU 102, a memory 104, and an input/output port 106 and the computer 12 includes a CPU 122, a memory 124 and an input/output port 126. CPUs 102 and 122 perform various mathematical processes. Memories 104 and 124 store values utilized in the various mathematical processes, in particular pre-computed values needed for exponentiation in the present invention. Also, input/output ports 106 and 126 allow connection to the modems 14 and 18.

The present invention may be used with the system of FIG. 10 in a variety of ways to transmit coded data between the computer 10 and the computer 12 through the network 16.

In the Schnorr identification scheme, suppose that user A wants to prove its identity to user B. As system parameters, two primes p and q, and base g are made public such that $q|p-1, g\neq 1, g^q=1 \mod p$. The prover A possesses a secret key $s \in [0,q)$ and publishes the corresponding public key $y=g^x \mod p$, and wants to prove that he knows the secret key x to user B. The procedure for identification is as follows:

| user A | | user B |
|---|---|---|
| 1) randomly selects<br>k ∈ [0, q)<br>and computes<br>r = $g^k$ mod p | ----r---→ | randomly selects<br>e ∈ [0, $2^t$)<br>for some integer t |
| 2) computes<br>s = k − xe mod q | ←---e--- | |
| 3) | ---s---→ | accepts proof of<br>identity if<br>$g^s y^e$ = r mod p |

In the above example, the exponentiation method according to the present invention can be used in calculating $g^k$ in 1) and $g^s y^e$ in 3).

In the Digital Signature Standard (DSS), there are three public system parameters p, q and g: primes p, q such that $q|p-1$, and base g such that $g\neq 1$ and $g^q=1 \mod p$. And each signer A selects its secret key $x \in [0,q)$ and publishes the public key $y=g^x \mod p$. The signer A can generate a signature for a message m using its secret key and sends the message including the signature to the verifier B. Then the verifier B can check the validity of the signature using A's public key. The signature generation and verification procedures are described below, where H denotes the secure hash algorithm (SHA).

Signer A generates signature (r,s) for message m and sends (r,s) to Verifier B:

1) randomly selects k $\in [0,q)$ and computes r=($g^k$ mod p) mod q 2) computes s=$k^{-1}$(H(m)+rx) mod q Verifier B verifies the signature (r,s) by checking that ($g^{s^{-1}H(m)}y^{s^{-1}r}$ mod p) mod q=r.

In the above example, exponentiation methods according to embodiments of the present invention can be used to calculate $g^k$ and $g^{s^{-1}H(m)}y^{s^{-1}r}$.

In the Diffie-Hellman key exchange scheme, user A and user B agree upon a common secret key $K_{AB}$ through communications over a public channel. Here, p, q and g are public parameters defined as before.

1) user A randomly selects $R_A \in [0,q)$, computes and sends $X_A = g^{R_A}$ mod p to user B;

2) user B randomly selects $R_B \in [0,q)$, computes and sends $X_B = g^{R_B}$ mod p to user A;

3) user A computes $K_{AB} = X_B^{R_A}$ mod p=$g^{R_B R_A}$ mod p;

4) user B computes $K_{AB} = X_A^{R_B}$ mod p=$g^{R_A R_B}$ mod p.

In the above example, exponentiation methods according to embodiments of the present invention can be used to calculate $$g^{R_A}, g^{R_B}.$$

We claim:

1. In a cryptographic system, a computer-implemented method for transforming a first signal into a second signal in a manner infeasible to invert, the method comprising:

exponentiating a first digital input signal g by a second digital input signal R, wherein g is a fixed signal unique to a cryptographic system and R is a randomly generated digital signal of n bits, n being an integer specified by the cryptographic system, to obtain a third digital signal $g^R$, wherein the exponentiating comprises:

(a) determining integers h and v, and calculating a and b such that a is the least integer not less than a fractional number n/h and b is the least integer not less than a fractional number a/v, whereby an arbitrary n bit number can be divided into h blocks of size a and each divided block can be further subdivided into v smaller blocks of size b;

(b) precomputing and storing, in a plurality of memory locations G[j][f] indexed by j and f, $0 \leq j \leq v-1$ and $0 \leq f \leq 2^h - 1$, within a computing device, a plurality of values $$(g_{h-1}^{e_{h-1}} g_{h-2}^{e_{h-2}} \ldots g_1^{e_1} g_0^{e_0})^{2^{ib}}$$

where $g_i = g^{2^{ia}}$ for $0 \leq i \leq h-1$, and $f = e_{h-1}e_{h-2} \ldots e_1 e_0$ with $e_i = 0$ or 1, wherein the index f corresponds to the decimal value of the binary representation $e_{h-1}e_{h-2} \ldots e_1 e_0$ and ranges from 0 to $2^h - 1$;

(c) dividing the exponent R into h blocks $R_i$ of size a for i=0, 1, . . . , h-1 and subdividing each of the blocks $R_i$ into v sub-blocks $R_{i,j}$ of size b for j=0, 1, . . . , v-1; and (d) computing the second signal x=$g^R$, using the stored values from the memory locations G[j][$I_{j,k}$], as (e) using the second signal x to encrypt or decrypt data.

$$\prod_{k=0}^{b-1} \left( \prod_{j=0}^{v-1} G[j][I_{j,k}] \right)^{2^k}$$

where $I_{j,k}$ denotes an h-bit number formed by taking the k-th bits from the sub-blocks indexed by j in the second subscript, the sub-blocks including $R_{h-1,j}, \ldots, R_{1,j}, R_{0,j}$.

2. The computer-implemented method of claim 1, wherein computing $g^R$ according to step (d) includes utilizing p processors operating in parallel wherein the i-th processor, for $0 \leq i \leq p$, i and p being integers computes the value $$\prod_{k=0}^{b-1} \left( \prod_{j=iw}^{iw+iw-1} G[j][I_{j,k}] \right)^{2^k}$$

using the stored values from the memory location G[j][$I_{j,k}$] for $iw \leq iw+w$ and $0 \leq I_{j,k} < 2^h$, to produce p computational results, where w is a least integer not less than a fractional number v/p and when v is not equal to a product pw, the index j in the (p-1)-th processor ranges from j=(p-1)w to v-1, and then multiplying together said p computational results to compute the value of $g^R$.

3. In a cryptographic system, a computer-implemented method for transforming a set of input digital signals into an output digital signal, said method comprising:

exponentiating each input signal $x_i$ by another input signal $K_i$ of b bits for i=0, 1, . . . , m-1, wherein $x_i$ and $K_i$ are variable values processed in a cryptographic system, and multiplying the exponentiated values together to produce an output digital signal $$z = \prod_{i=0}^{m-1} x_i^{k_i},$$

wherein the exponentiating comprises:

(a) arranging m exponents $K_i$ into an h×v matrix form, h and v being integers such that a product hv is not less than the integer m, and z being expressed as $$z = \prod_{j=0}^{v-1} \prod_{i=jh}^{jh+h-1} x_i^{K_i};$$

(b) computing and temporarily storing a plurality of values X[j][f] in a plurality of memory locations within a computing device, wherein X[j][f] denotes a value stored at a two dimensional array X indexed by row j and column f in a memory of the computing device defined by an expression:

$$X[j][f] = x_{jh+h-1}^{e_{h-1}} x_{jh+h-2}^{e_{h-2}} \ldots x_{jh+1}^{e_1} x_{jh}^{e_0}$$

for each j($0 \leq j \leq v-1$) and f($0 \leq i \leq 2^h - 1$), where $f = e_{h-1}e_{h-2} \ldots e_1 e_0$ with $e_i = 0$ or 1, and wherein f denotes the decimal value of the binary representation $e_{h-1}e_{h-2} \ldots e_1 e_0$; and (c) computing the output signal z using the values stored in step (b) as $$z = \prod_{k=0}^{b-1}\left(\prod_{j=0}^{v-1} X[j][I_{j,k}]\right)^{2^k}$$

where $I_{j,k}$ denotes an h-bit integer formed by the k-th bit from each element of the j-th column in the h×v matrix consisting of b-bit sub-blocks (d) using the output signal z to encrypt or decrypt data.

4. The computer-implemented method of claim 3, wherein step (c) is performed in parallel using p processors wherein the i-th processor, for $0 \leq i < p$, i and p being integers computes $$\prod_{k=0}^{b-1}\left(\prod_{j=iw}^{iw+iw-1} G[j][I_{j,k}]\right)^{2^k}$$

using the stored values from the memory locations $X[j][I_{j,k}]$ for $iw \leq iw+w$ and $0 \leq I_{j,k} < 2^h$, to produce p computational results, where w is a least integer not less than a fractional number v/p and in case that v is not equal to a product pw, the index j in the (p−1)-th processor ranges from j=(p−1)w to v−1, and then multiplying together said p computational results to compute the value for Z.

5. A computer-implemented method for verifying the identity of an individual or a device, the method comprising:

(a) determining integers h and v, and calculating a and b such that a is the least integer not less than a fractional number n/h, n being an exponent size in bits specified by a particular identification scheme, and b is the least integer not less than a fractional number a/v, whereby an arbitrary n bit number can be divided into h blocks of size a and each divided block can be further subdivided into v smaller blocks of size b;

(b) precomputing and storing, in a plurality of memory locations G[j][f] indexed by j and f, $0 \leq j \leq v-1$ and $0 \leq f \leq 2^h - 1$, within a computing device, a plurality of values $$(g_{h-1}^{e_{h-1}} g_{h-2}^{e_{h-2}} \ldots g_1^{e_1} g_0^{e_0})^{2^{jb}}$$

where $g_i = g^{2^{ia}}$ for $0 \leq i \leq h-1$, g being a fixed signal unique to said identification scheme, and $f = e_{h-1} e_{h-2} \ldots e_1 e_0$ with $e_i = 0$ or 1, that is the index f corresponds to the decimal value of the binary representation $e_{h-1} e_{h-2} \ldots e_1 e_0$ and ranges from 0 to $2^h - 1$;

(c) exponentiating the signal g by a first randomly generated digital signal R of size n bits to obtain a second digital signal $x = g^R$, wherein the exponentiating comprises:

dividing said exponent R into h blocks $R_i$ of size a for i=0, 1, ..., h−1;

subdividing each of the blocks $R_i$ into predetermined v sub-blocks $R_{i,j}$ of size b for j=0, 1, ..., v−1; and computing the second signal $x = g^R$, using the stored values from the memory locations $G[j][I_{j,k}]$, as $$\prod_{k=0}^{b-1}\left(\prod_{j=0}^{v-1} G[j][I_{j,k}]\right)^{2^k}$$

where $I_{j,k}$ denotes an h-bit number formed by the k-th bits from said sub-blocks indexed by j in the second subscript, the sub-blocks including $R_{h-1,j}, \ldots, R_{1,j}, R_{0,j}$;

(d) transmitting the second signal x to a verifier;

(e) receiving a third signal e from the verifier;

(f) computing a fourth signal y using the second signal x, said third signal e and other input signals specified by the identification scheme;

(g) transmitting the fourth signal y to the verifier; and (h) validating the fourth signal by the verifier as originating from an individual or a device.

6. A computer-implemented method for generating a digital signature to assure the integrity and origin of a message, the method comprising:

(a) determining integers h and v, and calculating a and b such that a is the least integer not less than a fractional number n/h, n being an exponent size in bits specified by a particular digital signature scheme, and b is the least integer not less than the fractional number a/v, whereby an arbitrary n bit number can be divided into h blocks of size a and each divided block can be further subdivided into v smaller blocks of size b;

(b) precomputing and storing, in a plurality of memory locations G[j][f] indexed by j and f, $0 \leq j \leq v-1$ and $0 \leq f \leq 2^h - 1$, within a computing device, a plurality of values $$(g_{h-1}^{e_{h-1}} g_{h-2}^{e_{h-2}} \ldots g_1^{e_1} g_0^{e_0})^{2^{jb}}$$

where $g_i = g^{2^{ia}}$ for $0 \leq i \leq h-1$, g being a fixed signal unique to the signature scheme, and $f = e_{h-1} e_{h-2} \ldots e_1 e_0$ with $e_i = 0$ or 1, that is the index f corresponds to the decimal value of the binary representation $e_{h-1} e_{h-2} \ldots e_1 e_0$ and ranges from 0 to $2^h - 1$;

(c) exponentiating the signal g by a first randomly generated digital signal R of size n bits to obtain a second digital signal $x = g^R$, wherein the exponentiating comprises:

dividing the exponent R into h blocks $R_i$ of size a for i=0, 1, ..., h−1;

subdividing each of the blocks $R_i$ into predetermined v sub-blocks $R_{i,j}$ of size b for j=0, 1, ..., v−1; and computing the second signal $x = g^R$, using the stored values from the memory locations $G[j][I_{j,k}]$, as $$\prod_{k=0}^{b-1}\left(\prod_{j=0}^{v-1} G[j][I_{j,k}]\right)^{2^k}$$

where $I_{j,k}$ denotes an h-bit number formed by the k-th bits from the sub-blocks indexed by j in the second subscript, the sub-blocks including $R_{h-1,j}, \ldots, R_{1,j}, R_{0,j}$;

(d) generating a digital signature for a message m using the second signal x and other input signals specified by the particular signature scheme;

(e) sending the digital signature and message to a verifier; and (f) checking the validity of the signature for the message by the verifier as originating from a legitimate user.

7. A computer-implemented method for sharing a common secret key by Diffie-Hellman key exchange scheme wherein a first computer communicates with a second computer to agree upon a common secret key K, the method comprising:

at a first computer:

(a) determining integers h and v, and calculating a and b such that a is the least integer not less than a fractional number n/h, n being an exponent size in bits specified by the key exchange scheme, and b is the least integer not less than a fractional number a/v, whereby an arbitrary n bit number is divided into h blocks of size a and each divided block can be further subdivided into v smaller blocks of size b;

(b) precomputing and storing, in a plurality of memory locations G[j][f] indexed by j and f, $0 \leq j \leq v-1$ and $0 \leq f \leq 2^h - 1$, within a computing device, a plurality of values $$(g_{h-1}^{e_{h-1}} g_{h-2}^{e_{h-2}} \ldots g_1^{e_1} g_0^{e_0})^{2^{jb}}$$

where $g_i = g^{2^{ia}}$ for $0 \leq i \leq h-1$, g being a fixed signal unique to the key exchange scheme, and $f = e_{h-1} e_{h-2} \ldots e_1 e_0$ with $e_i = 0$ or 1, wherein the index f corresponds to the decimal value of the binary representation $e_{h-1} e_{h-2} \ldots e_1 e_0$ and ranges from 0 to $2^h - 1$;

(c) exponentiating the signal g by a first randomly generated digital signal R of size n bits to obtain a second digital signal $x = g^R$, wherein the exponentiating comprises:

dividing said exponent R into h blocks $R_i$ of size a for i=0, 1, . . . , h−1;

subdividing each of the blocks $R_i$ into predetermined v sub-blocks $R_{i,j}$ of size b for j=0, 1, . . . , v−1; and computing the second signal $x = g^R$, using the stored values from the memory locations $G[j][I_{j,k}]$, as $$\prod_{k=0}^{b-1} \left( \prod_{j=0}^{v-1} G[j][I_{j,k}] \right)^{2^k}$$

where $I_{j,k}$ denotes an h-bit number formed by the k-th bits from the sub-blocks indexed by j in the second subscript, the sub-blocks including $R_{h-1,j}, \ldots, R_{1,j}, R_{0,j}$;

(d) transmitting x to a second computer;

at the second computer:

(e) randomly generating a third value S;

(f) computing a fourth signal $y = g^S$ according to steps (a)–(c);

(g) sending the fourth signal y to the first computer;

(h) at the first computer, computing a common key K, using the fourth signal y, the first signal R, as $K = y^R = g^{SR}$; and (i) at the second computer, computing the common key K, using the second signal x, the third signal S, as $K = x^S = g^{RS}$.

8. A cryptographic system where a first signal is transformed into a second signal in a manner infeasible to invert, the system comprising:

an exponentiator for exponentiating a first digital input signal g by a second digital input signal R, wherein g is a fixed signal unique to a cryptographic system and R is a randomly generated digital signal of n bits, n being an integer specified by the cryptographic system, to obtain a third digital signal $g^r$, wherein the exponentiator further comprises:

a means for determining integers h and v, and calculating a and b such that a is the lest integer not less than a fractional number n/h and b is the least integer not less than a fractional number a/v, whereby an arbitrary n bit number can be divided into h blocks of size a and each divided block can by further subdivided into v smaller blocks of size b;

a means for precomputing and storing, in a plurality of memory locations G[j][f] indexed by j and f, $0 \leq f \leq 2^h - 1$, within a computing device, a plurality of values $$(g_{h-1}^{e_{h-1}} g_{h-2}^{e_{h-2}} \ldots g_1^{e_1} g_0^{e_0})^{2^{jb}}$$

where $g_1 = g^{2^{ia}}$ for $0 \leq i \leq h-1$, and $f = e_{h-1} e_{h-2} \ldots e_1 e_0$ with $e_i = 0$ or 1, wherein the index f corresponds to the decimal value of the binary representation $e_{h-1} e_{h-2} \ldots e_1 e_0$ and ranges from 0 to 2−1;

a divider for dividing the exponent R into h blocks $R_{i,j}$ of size b for j=0, 1, . . . , v−1; and a means for computing the second signal $x = g^R$, using the stored values from the memory locations $G[j][I_{j,k}]$, as $$\prod_{k=0}^{b-1} \left( \prod_{j=0}^{v-1} G[j][I_{j,k}] \right)^{2^k}$$

where $I_{j,k}$ denotes an h-bit number formed by taking the k-th bits from the sub-blocks indexed by j in the second subscript, the sub-blocks including $R_{h-1,j}, \ldots, R_{1,j}, R_{0,j}$; and a means for using the second signal x in encrypting or decrypting data.

* * * * *